United States Patent [19]

Egglhuber

[11] Patent Number: 6,050,254
[45] Date of Patent: Apr. 18, 2000

[54] WIRE SAW, REPAIR STATION, MAINTENANCE AND TESTING STATION FOR A WIRE-GUIDING-ROLLER UNIT OF THE WIRE SAW, AND METHOD OF EXCHANGING THE WIRE-GUIDING-ROLLER UNIT

[75] Inventor: Karl Egglhuber, Hebertsfelden, Germany

[73] Assignee: Wacker Siltronic Gesellschaft Für Halbleitermaterialien AG, Burghausen, Germany

[21] Appl. No.: 09/056,831

[22] Filed: Apr. 7, 1998

[30] Foreign Application Priority Data

Apr. 24, 1997 [DE] Germany .............. 197 17 379

[51] Int. Cl.⁷ .................................. B28D 1/08
[52] U.S. Cl. ..................... 125/16.02; 125/21
[58] Field of Search ............... 125/16.01, 16.02, 125/21; 83/165.1

[56] References Cited

U.S. PATENT DOCUMENTS

| | | | |
|---|---|---|---|
| 3,831,576 | 8/1974 | Mech .......................... | 125/16.01 X |
| 5,269,285 | 12/1993 | Toyama et al. .............. | 125/16.02 X |
| 5,564,409 | 10/1996 | Bonzo et al. ................ | 125/16.01 X |
| 5,575,189 | 11/1996 | Kiuchi et al. ................ | 125/16.02 X |
| 5,616,065 | 4/1997 | Egglhuber . | |
| 5,758,633 | 6/1998 | Hauser ........................ | 125/16.02 |

FOREIGN PATENT DOCUMENTS

| | | |
|---|---|---|
| 0733429 | 3/1996 | European Pat. Off. . |
| 0733429 | 9/1996 | Germany . |
| 677895 | 7/1991 | Switzerland . |
| 679136 | 12/1991 | Switzerland . |

OTHER PUBLICATIONS

Derwent Abstract corresponding to CH–677895 A.
Derwent Abstract corresponding to CH 679136 A.
Patent Abstracts of Japan, vol. 13, No. 458 (M–880), & JP 01177960 A (Sumitano Metal Ind, Ltd.)

*Primary Examiner*—David A. Scherbel
*Assistant Examiner*—Anthony Ojini
*Attorney, Agent, or Firm*—Collard & Roe, P.C.

[57] ABSTRACT

A wire saw for cutting wafers from a workpiece, has a cutting head in which at least two adjacent wire-guiding rollers are mounted rotatably in each case between a moveable bearing and a fixed bearing. These are adjacent wire-guiding rollers, together with a wire wound around them, form a wire web. Each wire-guiding roller and the moveable bearing and fixed bearing assigned to it form a wire-guiding-roller unit, which can only be removed from the cutting head as an entire unit. There is also a repair station and a maintenance and testing station for the wire-guiding-roller unit and a method of exchanging the wire-guiding-roller unit.

7 Claims, 5 Drawing Sheets

WIRE SAW, REPAIR STATION, MAINTENANCE AND TESTING STATION FOR A WIRE-GUIDING-ROLLER UNIT OF THE WIRE SAW, AND METHOD OF EXCHANGING THE WIRE-GUIDING-ROLLER UNIT

BACKGROUND OF THE INVENTION

1. Field of the Invention

The present invention relates to a wire saw for cutting wafers from a workpiece, in particular a wire saw for producing semiconductor wafers. The wire saw comprises a cutting head in which at least two wire-guiding rollers are rotatably mounted in each case between a moveable bearing and a fixed bearing, with adjacent wire-guiding rollers, together with a wire wound around them, forming a wire web. The wire web is used with a sawing suspension and functions as a cutting tool. A sawing suspension may be dispensed with if a sawing wire having bonded cutting particles is used. The invention also relates to a repair station and to a maintenance and testing station for a wire-guiding-roller unit and to a method of exchanging the wire-guiding-roller unit.

2. The Prior Art

A wire saw for cutting wafers and having a cutting head in which the wire-guiding rollers are mounted between a moveable bearing and a fixed bearing in this cutting head, is described, in EP-733 429 A1. This wire saw can be used to cut a multiplicity of semiconductor wafers of a specific thickness from a piece of crystal during a cutting operation. The thickness of the semiconductor wafers is determined by the distance between the windings of the sawing wire in the wire web. This distance, in turn, is essentially predetermined by grooves which are located in the coating of the wire-guiding rollers and in which the wire runs. The wire saw also has a heating/cooling system for controlling the temperature of the wire-guiding rollers and of the moveable bearing and fixed bearing adjacent thereto. In this way, undesired sawing-wire displacement as a result of heat expansion of machine parts can be minimized.

Occasionally, it is necessary to change the coating of the wire-guiding roller or to change the wire-guiding roller itself. For example, change may be needed when the cutting results deteriorate as a consequence of the coating being worn. Change may also be necessary if it is intended that the thickness of wafers which are to be cut subsequently should be modified to a new value. Deterioration of the cutting result may also indicate damaged bearings.

If the coating or the bearings are changed, it is necessary for the wire-guiding roller or the bearings to be removed from the cutting head. Up until now, this has been very expensive and has resulted in the wire saw being out of service and at a standstill for long periods of time. Once a new wire-guiding roller or new or repaired bearings have been introduced, the wire saw then still requires additional time. During this certain period of time, the wire saw is test run and is brought to the operating temperature before stable operation is possible. After this, a test workpiece then usually has to be sawed before the actual production of the wafers can proceed.

SUMMARY OF THE INVENTION

It is an object of the present invention to shorten the period during which the wire saw has to be at a standstill in order that a wire-guiding roller or bearings can be changed, and to simplify the procedure for changing a coating.

The invention relates to a wire saw for cutting wafers in which each wire-guiding roller and the moveable bearing and fixed bearing adjacent to it form a wire-guiding-roller unit. This unit can only be removed from the cutting heads as an entire unit.

The wire-guiding roller and the bearing shafts also form a rigid unit. This rigid unit is balanced as such and the bearing seats of this unit and the coating mount of this unit can be produced in one operation.

With the prior art devices, the bearing shafts have to be separated from the wire-guiding rollers in order for the rollers to be moved. Any coolant located in the bearing shafts and in the wire-guiding roller flows into the sawing area. This coolant changes the composition of the sawing suspension, with the result that the sawing suspension may even become unusable. This cannot take place in the case of the present invention since the wire-guiding roller and bearing shafts are removed as a unit.

The combination of the wire-guiding roller and moveable bearing and fixed bearing form a wire-guiding-roller unit. This unit not only permits swift removal of the wire-guiding roller and of the bearings. But this unit also makes it possible for the wire-guiding roller which has been removed to be provided with a new coating in a repair station. This makes it possible, following this and the reinstallation of the wire-guiding-roller unit into the wire saw, to dispense with the warm up stage. Thus, the warm up operation of the wire saw can be omitted for the purpose of reaching the necessary operating temperature.

With the wire-guiding-roller/bearing design of the prior art, the wire-guiding rollers are fastened between the fixed-bearing shaft and moveable-bearing shaft. For this reason, the drive forces are transmitted, but the bearing shafts and wire-guiding roller do not form a single-piece, rigid unit. The fixed-bearing and moveable-bearing shafts are therefore each mounted with two bearing assemblies for stabilizing purposes.

The 3-part screwed arrangement of the bearing shafts and wire-guiding roller involves a high expense and results in misalignment and thus causes a stressing of the shaft system. This stressing, in turn results in shortening the service life of the bearings and in an uncontrolled heating of the bearings. Moreover, the geometry of the wafers which are to be cut is influenced by the erratic operation which occurs as a result of misalignment.

The present invention thus also achieves the object of avoiding misalignment, of simplifying the bearing design and of ensuring smooth running.

The present invention also relates to a repair station for a wire-guiding-roller unit with a wire-guiding roller, a moveable bearing and a fixed bearing, comprising a) supporting surfaces for supporting the wire-guiding-roller unit;
b) retaining elements for fixing the wire-guiding-roller unit on the supporting surfaces;
c) a heating/cooling system for controlling the temperature of the wire-guiding-roller unit; and
d) means for detaching a covering from the wire-guiding roller.

The period during which the wire saw is at a standstill is shortened considerably if the wire-guiding-roller unit which has been removed from the wire saw is replaced by another wire-guiding-roller unit, which has previously been prepared for use in a fitting station.

It is also possible for the bearings of the wire-guiding-roller unit which has been removed from the wire saw to be repaired or exchanged outside the wire saw. It is also possible for the wire-guiding-roller unit to be run in a maintenance and testing station once the bearings have been repaired or changed. During this time, the wire saw can be used to produce wafers with a wire-guiding-roller unit which, for example, has been prepared and run in another maintenance and testing station. The elimination of a warm-up phase in the wire saw and the sawing of a test workpiece means the following. Thus, the period during which the wire saw is at a standstill and out of operation is shortened to the time taken to exchange wire-guiding-roller units.

The present invention thus also relates to a maintenance and testing station for a wire-guiding-roller unit with a wire-guiding roller, a moveable bearing and a fixed bearing, comprising a) bearing supports for the bearings of the wire-guiding-roller unit;
b) a heating/cooling system for controlling the temperature of the wire-guiding-roller unit;
c) a drive for running-in the wire-guiding-roller unit; and
d) a device for monitoring the running-in operation of the wire-guiding-roller unit.

Lastly, the present invention relates to a method of exchanging a wire-guiding-roller unit of a wire saw for cutting wafers from a workpiece. The method is defined in that the wire-guiding-roller unit, which comprises a wire-guiding roller provided with a coating as well as a moveable bearing and a fixed bearing, is displaced axially from an operating position into a release position and is removed from the wire saw with the aid of a manipulator, and a wire-guiding-roller unit which has been temperature-controlled in advance is moved into the operating position.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
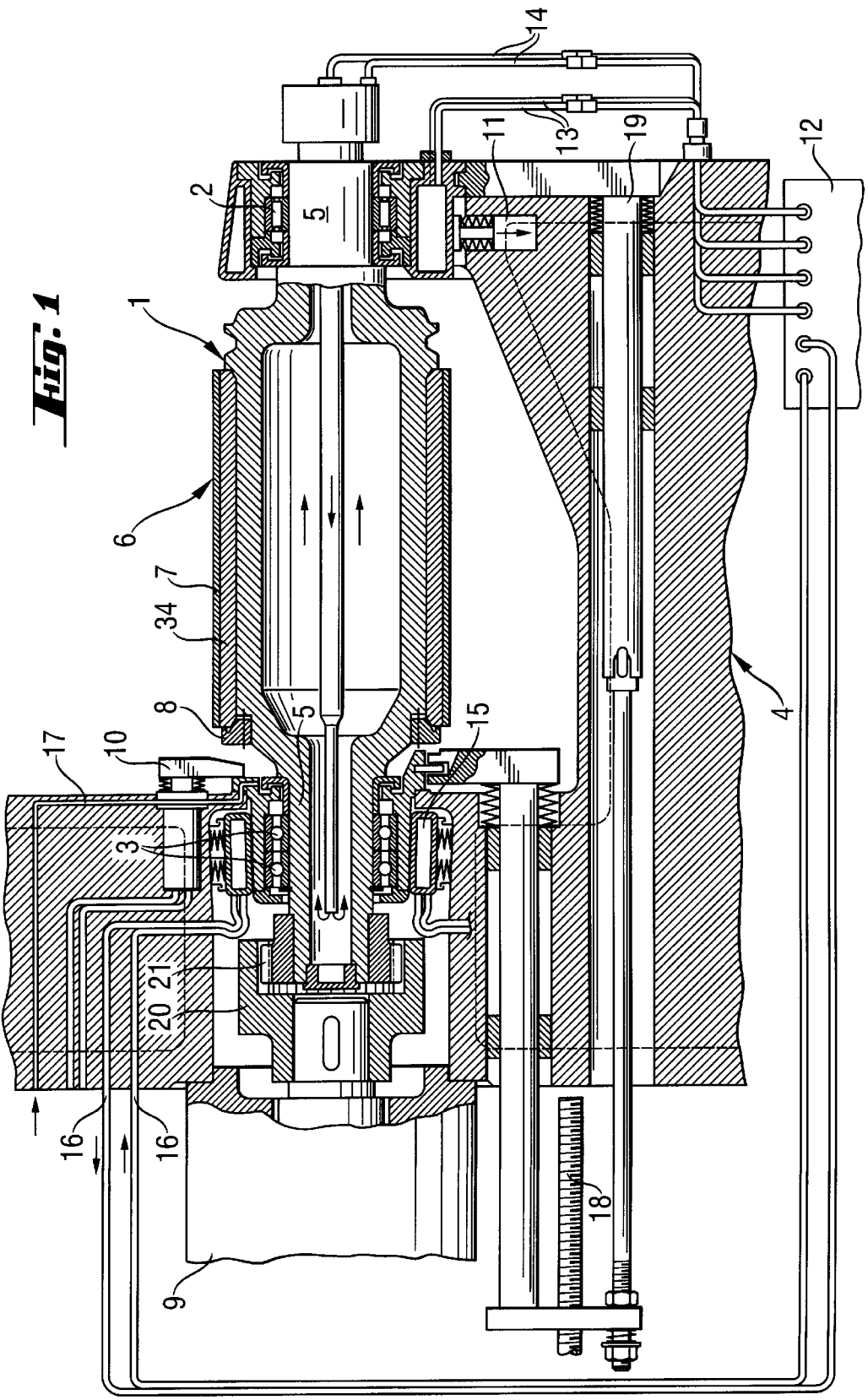
FIG. 1 shows a wire-guiding-roller unit installed in a wire-saw cutting head.

Turning now in detail to the drawings, FIG. 1 shows that wire-guiding roller 1 is rotatably mounted between a moveable bearing 2 and a fixed bearing 3 in a cutting head 4. Preferably 2 to 4 wire-guiding rollers are accommodated in the cutting head, and at least one of them is driven. The cylindrical body of the wire-guiding roller is tapered at the ends to form a bearing shaft 5. The moveable bearing 2 and the fixed bearing 3 are seated on the bearing shaft and form a wire-guiding-roller unit 6 within the wire-guiding roller 1. Located on the wire-guiding roller is a single-piece coating 7 which has guide grooves (not illustrated) and is centered by a releasable ring 8 and is secured against axial displacement. The wire-guiding roller illustrated is driven by a motor 9, of which the torque is transmitted directly via a coupling. According to the invention, it is unimportant for the wire-guiding roller to have its own drive. Pivot tensioners 10 are provided in order to safeguard against undesired axial displacement of the wire-guiding-roller unit. Clamping elements 11 are provided in order to fix the moveable bearing 2. These fix the wire-guiding-roller unit in the cutting head in an operating position. The pivot tensioners 10 and the clamping elements 11 are preferably moved hydraulically.

The temperature of the wire-guiding-roller unit is controlled with the aid of a heating/cooling system 12. This system comprises supply lines 13 and 14 which are connected to channels in the interior of the wire-guiding roller and the interior of the moveable bearing. This system will maintain circulation of temperature-controlling medium in the wire-guiding roller and in the moveable bearing. The heating/cooling system also comprises temperature-controlling segments 15 with corresponding supply lines 16 for controlling the temperature of the fixed bearing from the outside. These segments butt against the slightly conically designed lateral surface of the fixed bearing and are pressed against the lateral surface by springs. A constant airstream can be directed into the region of the fixed bearing with the aid of a sealed air line 17, and constituents of the sawing suspension or of the abraded material produced during the cutting operation are thus prevented from being able to penetrate into the fixed bearing.

A removal aid is provided for the purpose of removing the wire-guiding-roller unit from the wire saw. In the exemplary embodiment illustrated in FIG. 1, this removal aid comprises a linear carriage system 19 which is provided with a spindle drive 18 and by means of which the wire-guiding-roller unit 6 can be displaced axially into a release position. Prior to this, it is necessary for the sawing wire to be removed and for the arresting action of the pivot tensioners 10 and clamping elements 11 to be eliminated. Furthermore, the supply lines 13 and 14 have to be separated from the wire-guiding-roller unit, and independent closing valves are provided for this purpose at the separation points.

Figure 2:
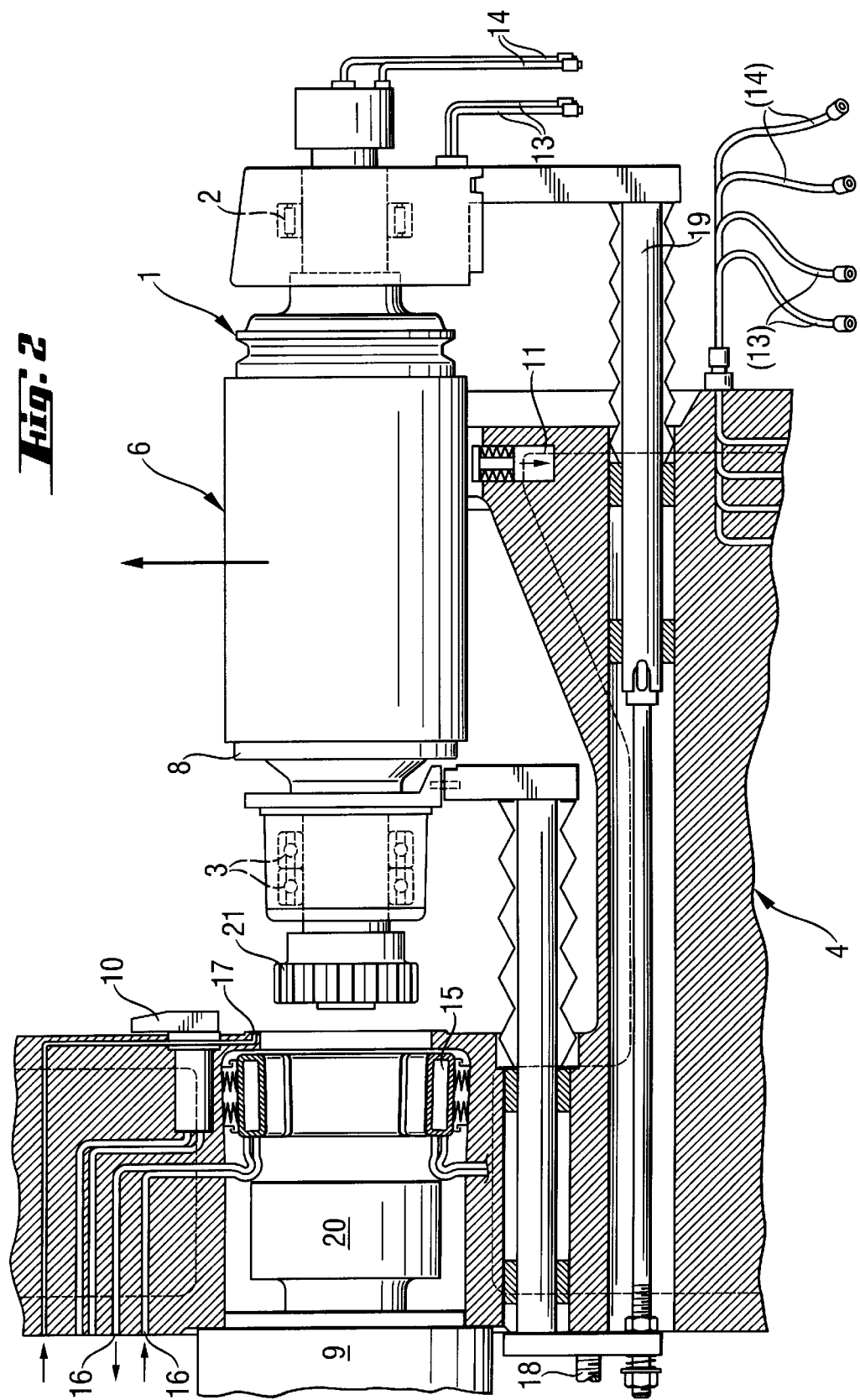
FIG. 2 shows the wire-guiding-roller unit according to FIG. 1 in a release position, in which it can be lifted out of the cutting head.

A situation in which the wire-guiding-roller unit is already located in the release position is illustrated in FIG. 2. The embodiment of the wire which is shown has a coupling between the drive and the fixed bearing. Upon displacement of the wire-guiding-roller unit into the release position, this coupling is automatically separated into a half 20 which remains in the saw head and a half 21 which remains connected to the wire-guiding-roller unit 6. The sealed air line 17 is likewise automatically separated during the displacement of the wire-guiding-roller unit. In the release position, it is possible, with the aid of a manipulator, for the wire-guiding-roller unit to be lifted out of the saw head in the direction of the arrow and transferred, for example, into a fitting station. In order to avoid longer periods during which the wire saw is at a standstill, another wire-guiding-roller unit, which has already been prepared for use, is moved into the operating position. This movement is preferably immediately after the original wire-guiding-roller unit has been removed, in the reverse order to which said removal operation takes place. Of course, it is possible that the wire-guiding-roller unit which has been remove can also be reconditioned. For example, this unit can be cleaned and provided with a new coating, and then replaced in its original position in the cutting head. When the wire-guiding-roller unit is installed, the temperature-controlling segments 15 automatically come into contact with the lateral surface of the fixed bearing 3 (FIG. 1). There is no need for any supply lines to be connected.

Figure 3:
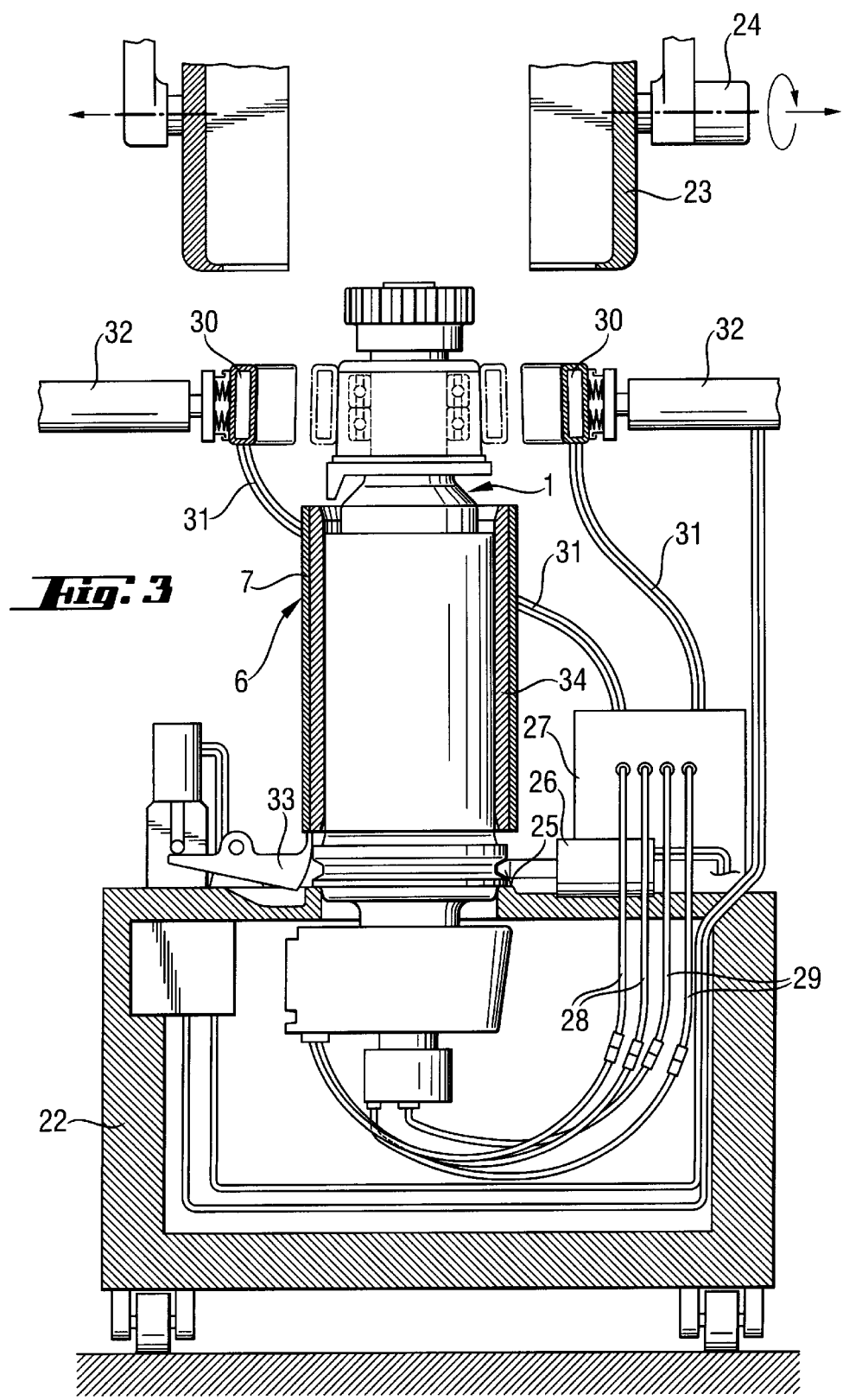
FIG. 3 shows the wire-guiding-roller unit according to FIG. 2 in a repair station according to the invention.

The coating of the wire-guiding roller is changed in a repair station provided for this purpose. FIG. 3 illustrates a repair station 22 with a wire-guiding-roller unit 6 accommodated therein and part of a manipulator which is suitable for moving the wire-guiding-roller unit. The manipulator preferably has grippers 23, which enclose the wire-guiding-roller unit laterally, and a pivot spindle 24, which allows the wire-guiding-roller unit to rotate through 90°. The wire-guiding-roller unit which has been removed from the cutting head is rotated through this angle and is set down. Alternatively, if appropriate, unit 6 can be fitted onto supporting surfaces 25 of the repair station and then is fixed thereon by retaining elements 26. The repair station 22 is provided with a heating/cooling system 27 for controlling the temperature of the wire-guiding-roller unit 6. This system 27 comprises supply lines 29 which are connected to channels in the interior of the wire-guiding roller and of the moveable bearing and of the fixed bearing. This system 27 maintains circulation of the temperature-controlling medium in the wire-guiding roller and in the moveable bearing and in the fixed bearing. Furthermore, the temperature of the moveable bearing is controlled from the outside via the supply lines 28. Temperature-controlling segments 30 with corresponding supply lines 31 are provided for controlling the temperature of the fixed bearing from the outside and can be moved up to the fixed bearing by means of linear advancement elements 32. Provided in the fitting station for the purpose of facilitating the operation of changing the coating 7 is a tool 33 which can detach the coating 7. In the exemplary embodiment illustrated coating 7 is molded onto a single-part sleeve 34, of the wire-guiding roller. The sleeve 34 is preferably produced from a CRP material (CRP= carbon-fiber-reinforced plastic). The sleeve is seated on a covering mount of the wire-guiding roller. It is also possible to manufacture the wire-guiding-roller unit entirely of a CRP material.

The heating/cooling system is used to control the temperature of the wire-guiding-roller unit in advance while it remains in the repair station. This has the result that, once it has subsequently been installed in the wire saw, there is no need for any warm-up phase during which the wire-guiding roller has to be brought to the operating temperature. All that is required in order to make the wire saw ready for operation again is to move the wire-guiding-roller unit into the operating position in the cutting head. This replacement occurs in the reverse order to which its removal operation takes place. Then it is necessary to provide the wire-guiding rollers with a new sawing wire.

The repair station may be constructed as a displaceable fitting carriage which, if required, is moved up to the wire saw. Another embodiment provides for the repair station and, if appropriate, also the manipulator to be positioned on the wire saw. Finally, it is also possible for the repair station to be constructed such that it can receive more than one wire-guiding-roller unit.

Figure 4:
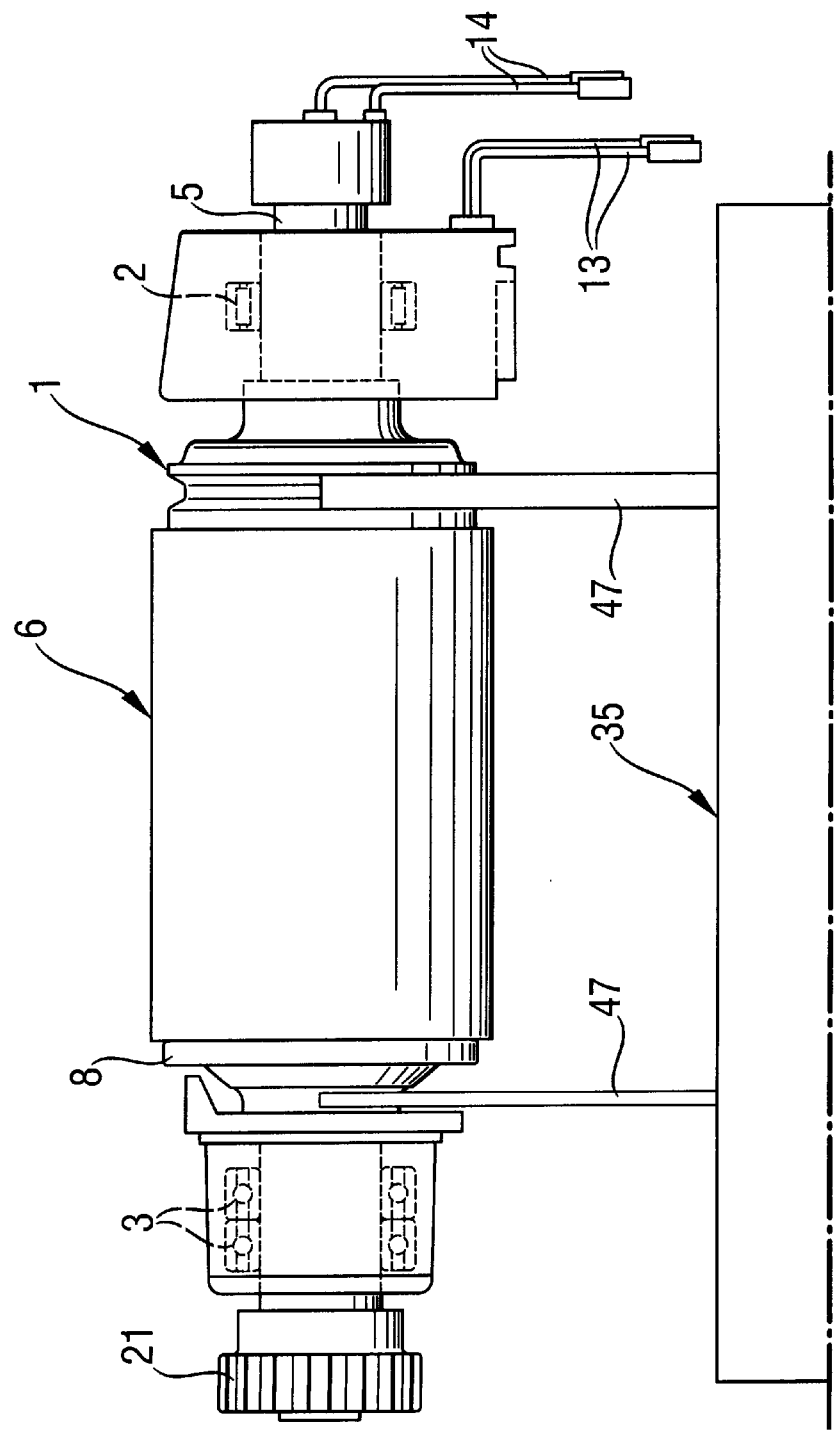
FIG. 4 shows the wire-guiding-roller unit according to FIG. 2 in an arrangement which is suitable for the purpose of repairing or changing the bearings.

If it is necessary for the bearings of the wire-guiding-roller unit to be repaired or changed, the wire-guiding-roller unit is removed from the wire saw in the repair station as has already been described and is preferably arranged such that the bearings are freely accessible. Such an arrangement is shown in FIG. 4. The wire-guiding-rolling unit 6 is positioned outside of the wire saw on a repair bench 35 and is supported on the bench by means of supports 47. Once the necessary work has been completed, the wire-guiding-roller unit is transferred to a maintenance and testing station.

Figure 5:
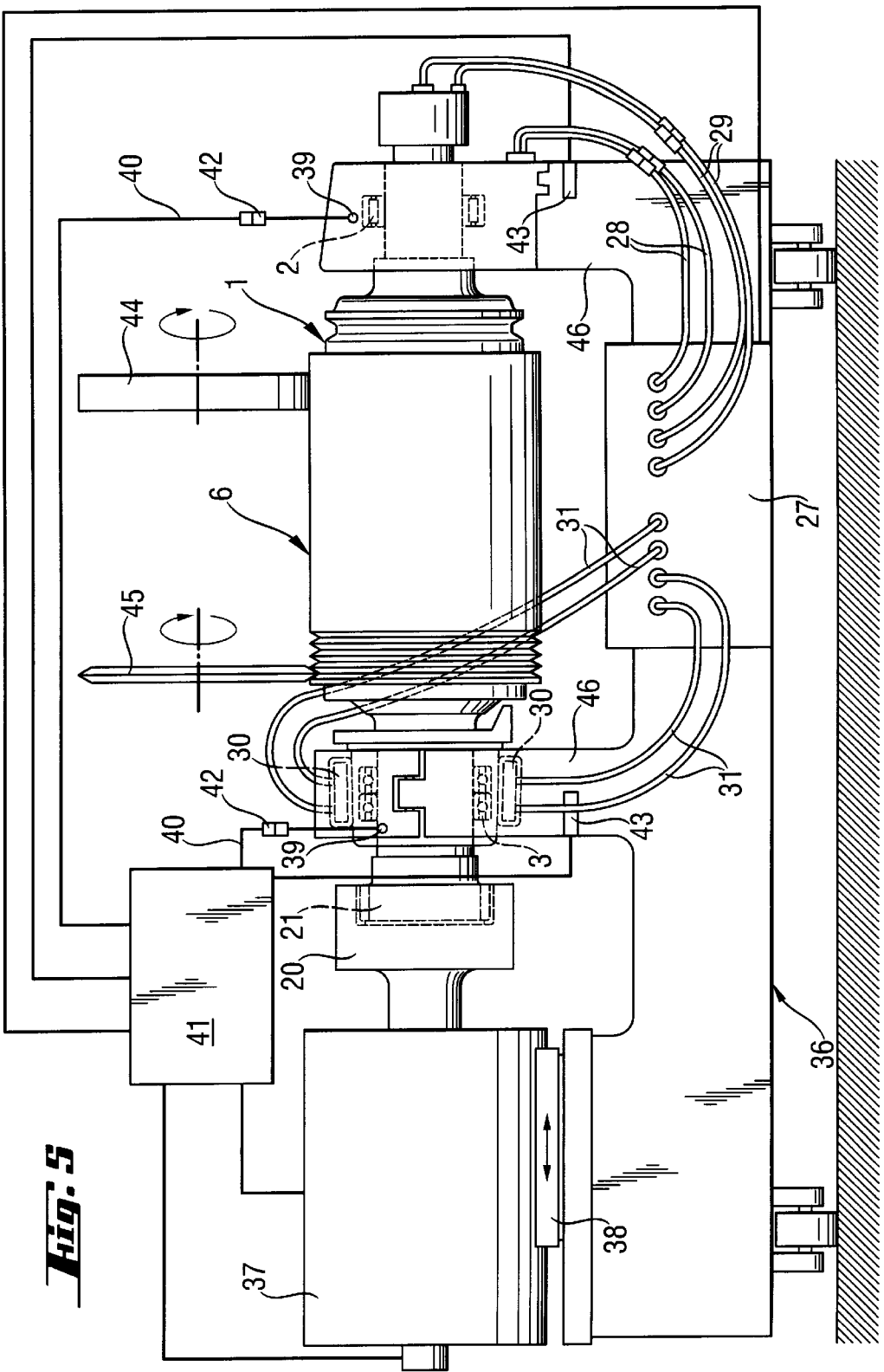
FIG. 5 shows the wire-guiding-roller unit according to FIG. 2 in a maintenance and testing station according to the invention.

FIG. 5 shows a suitable maintenance and warming-up or testing station 36, in which the wire-guiding-roller unit 6 has been deposited on bearing supports 46. A motor 37 for driving the wire-guiding-roller unit is located in the station. The motor is coupled to the wire-guiding-roller unit by virtue of a displaceable linear guide 38 being moved into position. The repaired or exchanged bearings 2 and 3 are driven, with the aid of a motor, at certain rotational speeds in accordance with a specified program. During the test run, measurements are taken of the temperatures of the bearings and the vibration caused by the rotating wire-guiding-roller unit. The test run, which may last several hours, is carried out with the purpose of preparing the wire-guiding-roller unit for use in the wire saw. The intention, in particular, is to bring the wire-guiding-roller unit to a constant operating temperature and to achieve low-vibration rotary movement of the wire-guiding-roller unit. The test run is controlled by a device 41 for monitoring the warm-up operation of the wire-guiding-roller unit. In the same way as the repair station according to FIG. 3, the maintenance and testing station 36 is provided with a heating/cooling system 27 for controlling the temperature of the wire-guiding-roller unit 6. The temperatures of the moveable bearing and fixed bearing are measured by temperature sensors 39. These measurements are continuously passed onto the monitoring device 41 via signal lines 40. The signal lines 40 are connected to the temperature sensors via quick-action couplings 42. Once the wire-guiding-roller unit has been installed in the wire saw, it is also possible for the temperature sensors to be connected to a wire-saw control means via the quick-action couplings.

Also connected to the monitoring device 41 are vibration sensors 43, which monitor the development of vibration during running of the wire-guiding-roller unit. If vibration values which are considered to be permissible are exceeded, the test run is terminated and the wire-guiding-roller unit is balanced.

According to a preferred embodiment, the maintenance and testing station 36 also has means which can recondition a damaged or worn coating of the wire-guiding roller. These means may comprise, for example, a cylindrical-grinding tool 44 and a groove-grinding tool 45. The cylindrical grinding tool regrinds the covering, and the groove-grinding tool grinds guide grooves in the covering. The drive of the grinding tools is not illustrated in FIG. 5.

Once it has been installed in the wire saw and provided with sawing wire, a wire-guiding-roller unit which has been prepared for use in the maintenance and testing station can be used immediately for the purpose of producing wafers. Periods during which the wire saw is out of service and at a standstill can be reduced to the time taken to exchange wire-guiding-roller units. This is because once it has been removed from the wire saw, a wire-guiding-roller unit is immediately replaced by another wire-guiding-roller unit which has been prepared for use in the manner described. In this way, warming-up and testing phases for the wire saw and the cutting of test pieces are eliminated.

While several embodiments of the present invention have been shown and described, it is to be understood that many changes and modifications may be made thereunto without departing from the spirit and scope of the invention as defined in the appended claims.

What is claimed is:

1. A wire saw for cutting wafers from a workpiece, comprising a cutting head;
   at least two adjacent wire-guiding rollers rotatably mounted in said cutting head;
   a moveable bearing and a fixed bearing attached to each wire-guiding roller; such that each roller is between each respective moveable bearing and each respective fixed bearing;
   said adjacent wire-guiding rollers, together with a wire wound around said rollers, forming a wire web; and
   each wire-guiding roller and the moveable bearing and fixed bearing attached to said roller form a wire-guiding-roller unit, which can be removed from the saw head as an entire unit.

2. The wire saw as claimed in claim 1, comprising
   a removal means provided in the cutting head; and
   said removal means comprising means for axially displacing the wire-guiding-roller unit.

3. The wire saw as claimed in claim 1, further comprising
   temperature-controlling means in the cutting head for controlling the temperature of the fixed bearing; and
   said fixed bearing having a lateral surface; and
   said temperature-controlling means remaining in the cutting head when the wire-guiding-roller unit is removed from the saw head; and said temperature-controlling means having means for automatically contacting said lateral surface of the fixed bearing when the wire-guiding-roller unit is installed into the cutting head.

4. The wire saw as claimed in claim 1, further comprising
   a bearing shaft for the wire-guiding roller; and
   said wire-guiding roller and said bearing shaft forming a rotating unit which remains together unseparated when the wire-guiding roller is removed from the wire saw.

5. The wire saw as claimed in claim 1, further comprising a single-part sleeve located on the wire-guiding-rollers, said single-part sleeve being made of a carbon-fiber-reinforced plastic material.

6. The wire saw as claimed in claim 1, wherein the wire-guiding-roller unit is made of a carbon-fiber-reinforced plastic material.

7. The wire saw as claimed in claim 1,
   wherein each wire-guiding roller and the moveable bearing and fixed bearing attached to said roller form a wire-guiding-roller unit which can only be removed from the saw head as an entire unit.

* * * * *